(12) United States Patent
Morita

(10) Patent No.: US 12,197,720 B2
(45) Date of Patent: Jan. 14, 2025

(54) INFORMATION PROCESSING APPARATUS, INFORMATION PROCESSING METHOD, AND RECORDING MEDIUM FOR CANCELING DISABLEMENT OF INPUT RECEPTION OF A TOUCH PANEL

(71) Applicant: Nobuhiro Morita, Kanagawa (JP)

(72) Inventor: Nobuhiro Morita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 5 days.

(21) Appl. No.: 17/664,451

(22) Filed: May 23, 2022

(65) Prior Publication Data
US 2022/0382449 A1 Dec. 1, 2022

(30) Foreign Application Priority Data

May 25, 2021 (JP) .................................. 2021-087780

(51) Int. Cl.
| | |
|---|---|
| *G06F 3/04886* | (2022.01) |
| *G06F 3/041* | (2006.01) |
| *G06F 3/04847* | (2022.01) |
| *H04N 1/00* | (2006.01) |

(52) U.S. Cl.
CPC ........ *G06F 3/04886* (2013.01); *G06F 3/0418* (2013.01); *G06F 3/04847* (2013.01); *G06F 2203/04804* (2013.01); *H04N 1/00411* (2013.01)

(58) Field of Classification Search
CPC ............... G06F 3/04886; G06F 3/0418; G06F 3/04847; G06F 2203/04804; G06F 3/0488; H04N 1/00411
See application file for complete search history.

(56) References Cited

U.S. PATENT DOCUMENTS

| | | | | |
|---|---|---|---|---|
| 2009/0111435 A1* | 4/2009 | Tsuei | ............... | H04M 1/724 |
| | | | | 455/566 |
| 2010/0162182 A1* | 6/2010 | Oh | ............... | G06F 3/017 |
| | | | | 715/863 |
| 2013/0314330 A1* | 11/2013 | Peterson | ............... | G06F 3/0416 |
| | | | | 345/173 |

(Continued)

FOREIGN PATENT DOCUMENTS

| | | |
|---|---|---|
| JP | 2003-233452 | 8/2003 |
| JP | 4378999 | 12/2009 |

(Continued)

OTHER PUBLICATIONS

Japanese Office Action for 2021-087780 mailed on Oct. 22, 2024.

*Primary Examiner* — KC Chen
(74) *Attorney, Agent, or Firm* — IPUSA, PLLC

(57) ABSTRACT

An information processing apparatus includes circuitry; and a memory storing computer-executable instructions that cause the circuitry to execute displaying, on a touch panel, a cancel button for canceling disablement of input reception of the touch panel; measuring a depression time during which the cancel button is pressed by a user; detecting a depression position at which the cancel button is pressed by the user; and cancelling the disablement in response to detecting that the depression time is longer than a cancel depression time defined in advance and that the depression position is continuously located at the same position.

12 Claims, 11 Drawing Sheets

(56) References Cited

U.S. PATENT DOCUMENTS

| | | | | |
|---|---|---|---|---|
| 2014/0049678 A1* | 2/2014 | Tanaka | ............... | G06F 3/04842 |
| | | | | 348/333.01 |
| 2018/0367659 A1* | 12/2018 | Kondo | ................... | H04M 11/00 |
| 2020/0174618 A1* | 6/2020 | Wang | ................... | G06F 3/0488 |
| 2021/0019044 A1* | 1/2021 | Herrmann | ............. | G06F 3/0418 |

FOREIGN PATENT DOCUMENTS

| | | |
|---|---|---|
| JP | 2013-214189 | 10/2013 |
| JP | 2015-181239 | 10/2015 |
| JP | 6815546 | 1/2021 |

* cited by examiner

FIG.1
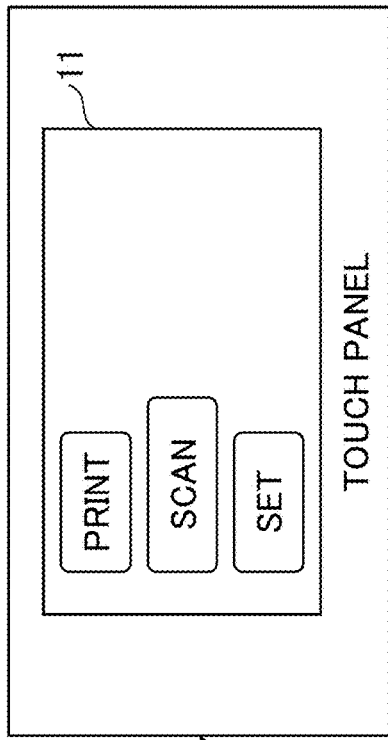
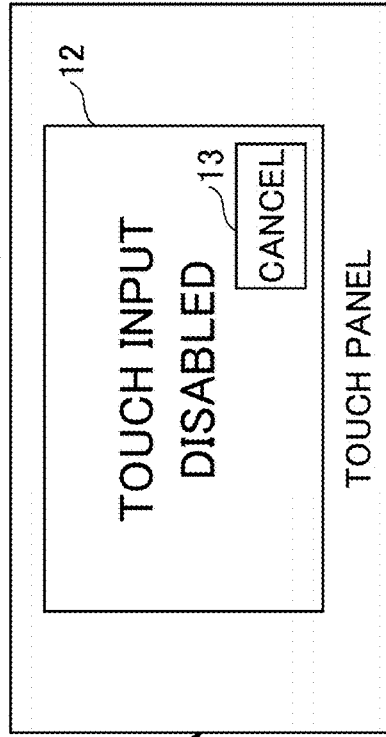
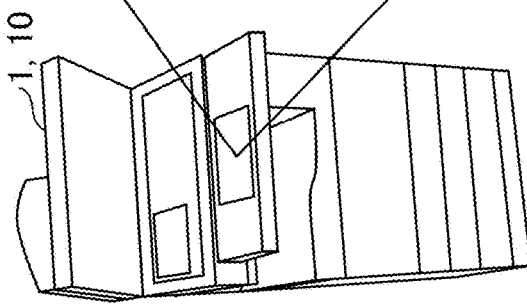

INFORMATION PROCESSING APPARATUS, INFORMATION PROCESSING METHOD, AND RECORDING MEDIUM FOR CANCELING DISABLEMENT OF INPUT RECEPTION OF A TOUCH PANEL

CROSS-REFERENCE TO RELATED APPLICATION

The present application is based on and claims priority under 35 U.S.C. § 119 to Japanese Patent Application No. 2021-087780, filed on May 25, 2021, the contents of which are incorporated herein by reference in their entirety.

BACKGROUND OF THE INVENTION

1. Field of the Invention

The present invention relates to an information processing apparatus, an information processing method, and a recording medium.

2. Description of the Related Art

In order to prevent malfunctions caused by touching the touch panel when cleaning the touch panel attached to an apparatus such as an image forming apparatus, a technique of temporarily disabling the input reception of the touch panel is known (see, for example, Patent Document 1). In Patent Document 1, the input of the touch panel is disabled for a predetermined time, and the background color of the screen is a black color, thereby making smears on the screen more conspicuous and improving the workability when cleaning by the user.

Patent Document 1: Japanese Patent No. 4378999

SUMMARY OF THE INVENTION

According to one aspect of the present invention, there is provided an information processing apparatus including circuitry; and a memory storing computer-executable instructions that cause the circuitry to execute displaying, on a touch panel, a cancel button for canceling disablement of input reception of the touch panel; measuring a depression time during which the cancel button is pressed by a user; detecting a depression position at which the cancel button is pressed by the user; and cancelling the disablement in response to detecting that the depression time is longer than a cancel depression time defined in advance and that the depression position is continuously located at the same position.

BRIEF DESCRIPTION OF THE DRAWINGS

FIG. 1 is a schematic conceptual diagram of an information processing apparatus according to an embodiment of the present invention;

DESCRIPTION OF THE EMBODIMENTS

Figure 2:
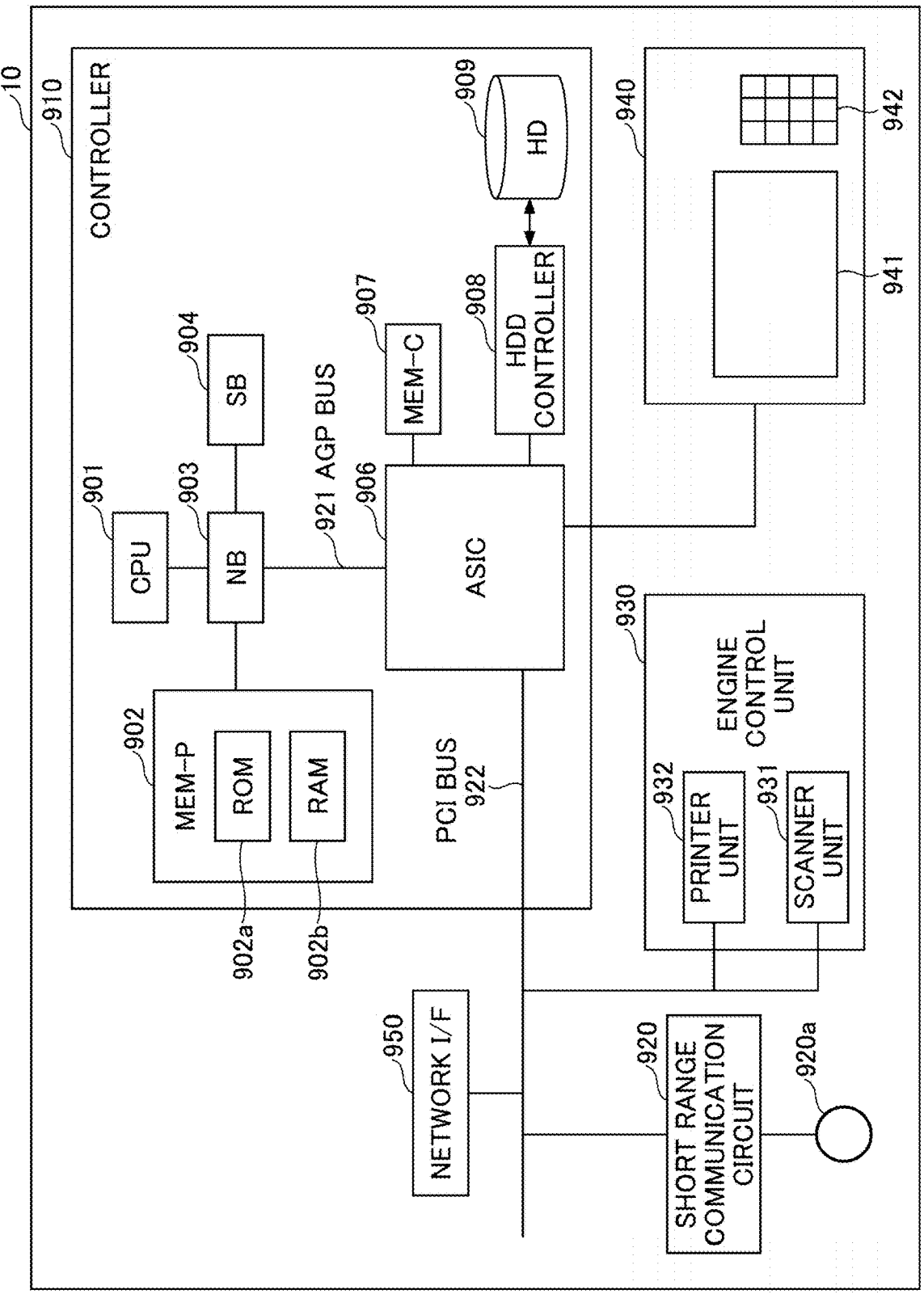
FIG. 2 is a diagram illustrating an example of a hardware configuration of an image forming apparatus according to an embodiment of the present invention.

There has been a problem in the conventional technology in that, after the input reception on the touch panel is disabled, all inputs on the touch panel are disabled, and, therefore, the user cannot cancel the disablement of input reception at any timing.

A problem to be addressed by an embodiment of the present invention is to enable a user to cancel the disablement of the input reception on the touch panel at any timing.

Hereinafter, an information processing apparatus, an information processing method, and a recording medium according to embodiments of the present invention will be described in detail with reference to the accompanying drawings.

In the present embodiment, when the input reception of a touch panel attached to a device such as an image forming apparatus is temporarily disabled, a button for canceling the disablement is displayed, thereby enabling the user to cancel the disablement of input reception at any timing. Further, considering the convenience when cleaning the touch panel, by cancelling the disablement only under limited conditions with respect to the depression position and the depression time of the cancel button, it is possible to prevent the user from accidentally cancelling the disablement. Here, the depression position is the position on the touch panel where the user's finger touches when the user presses the cancel button, and the depression time is the length of time while the user's finger is continuously touching the touch panel. Further, by a process of changing the position of the cancel button or displaying the cancel button to appear transparent, it is possible to easily confirm a smear at the position where the cancel button is displayed.

<Example of System Configuration>

FIG. 1 is a conceptual diagram illustrating an information processing apparatus according to an embodiment. An information processing apparatus 1 is a device having a touch panel such as an image forming apparatus 10. Normally, a menu screen 11 for using the image forming apparatus is displayed on the touch panel. However, when cleaning the touch panel and the like, in order to prevent an accidental operation of the menu screen 11, an input disablement screen 12 in which the input reception on the touch panel is disabled is displayed. In the present embodiment, a cancel button 13 for canceling the disablement of the input reception on the touch panel by the user at any timing is displayed on the input disablement screen 12.

The function to disable the input reception of the touch panel may be included in the information processing apparatus 1 or the image forming apparatus 10, or the function may be included in the touch panel. The information processing apparatus 1 may be implemented by one information processing apparatus 1 or may be implemented by being distributed among two or more information processing apparatuses.

<Hardware Configuration>

FIG. 2 is a diagram illustrating an example of the hardware configuration of the image forming apparatus 10. As illustrated in FIG. 2, the image forming apparatus 10 includes a controller 910, a short range communication circuit 920, an engine control unit 930, an operation panel 940, and a network I/F 950. The operation panel 940 includes a touch panel 941 for receiving user input and a numeric pad 942 for receiving user input. Among these, the controller 910 includes a central processing unit (CPU) 901, a system memory (MEM-P) 902, a northbridge (NB) 903, a south bridge (SB) 904, an Application Specific Integrated Circuit (ASIC) 906, a local memory (MEM-C) 907 that is a storage unit, a hard disk drive (HDD) controller 908, and a HD 909 that is a storage unit, and the NB 903 and the ASIC 906 are connected by an Accelerated Graphics Port (AGP) bus 921.

Among these, the CPU 901 is a control unit that performs control of the entire image forming apparatus. The NB 903 is a bridge for connecting the CPU 901 to the MEM-P 902, the SB 904, and the AGP bus 921, and has a memory controller for controlling reading and writing from and to the MEM-P 902, a Peripheral Component Interconnect (PCI) master, and an AGP target.

The MEM-P 902 includes a read-only memory (ROM) 902a, which is a memory for storing programs and data for implementing each function of the controller 910, and a random access memory (RAM) 902b, which is used as a rendering memory for loading programs or data and for memory printing. The program stored in the RAM 902b may be provided by being recorded in a computer-readable recording medium such as a compact disk read-only memory (CD-ROM), a CD recordable (CD-R), or a digital versatile disc (DVD) in a file in an installable format or an executable format.

The SB 904 is a bridge for connecting the NB 903 to PCI devices and peripheral devices. The ASIC 906 is an integrated circuit (IC) for image processing applications having hardware elements for image processing and serves as a bridge connecting the AGP bus 921, the PCI bus 922, the HDD 908, and the MEM-C 907. The ASIC 906 includes a PCI target and an AGP master, an arbiter (ARB) that forms the core of the ASIC 906, a memory controller that controls the MEM-C 907, a plurality of Direct Memory Access Controllers (DMACs) that rotates image data by hardware logic and the like, and a PCI unit that performs data transfer between a scanner unit 931 and a printer unit 932 via the PCI bus 922. To the ASIC 906, an interface of the Universal Serial Bus (USB) or an interface of the IEEE 1394 (Institute of Electronic and Electronic Engineers 1394) may be connected.

<Functions>

Figure 3:
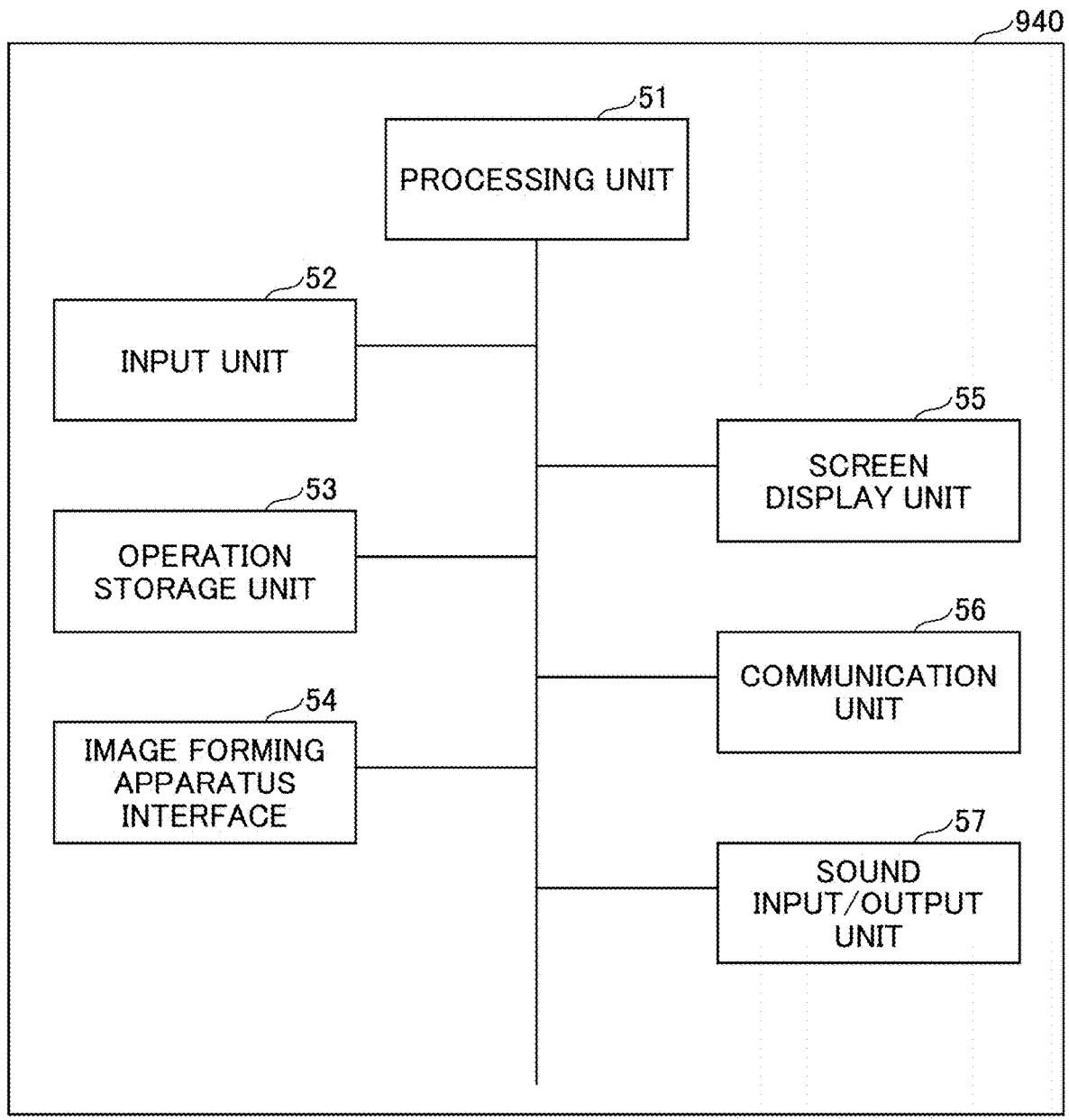
FIG. 3 is a diagram illustrating an example of a functional configuration of an operation panel according to an embodiment of the present invention.

FIG. 3 is a diagram illustrating an example of a function configuration of an operation panel according to an embodiment. As illustrated in FIG. 3, the operation panel 940 includes a processing unit 51, an input unit 52, an operation storage unit 53, an image forming apparatus interface 54, a screen display unit 55, a communication unit 56, and a sound input/output unit 57. The processing unit 51 executes a program pertaining to the operation panel. The input unit 52 receives user input via a touch panel or the like. The operation storage unit 53 stores operations or the like input from the input unit 52. The image forming apparatus interface 54 is an interface for communicating with the image forming apparatus 10. For example, the image forming apparatus interface 54 receives a request for a notification display and a display screen from the image forming apparatus 10 via this interface. In the case of an operation panel of an apparatus other than the image forming apparatus 10, this interface is not necessary, but an interface corresponding to the apparatus may be necessary. The screen display unit 55 displays a screen, such as a menu screen, on the touch panel. The communication unit 56 communicates with an external device via a wireless LAN (local area network) or a Bluetooth (registered trademark). The sound input/output unit 57 performs sound input/output by using a microphone, a speaker, or the like. The application that disables the input reception of the touch panel may be executed by the processing unit 51 of the operation panel or may be executed by the CPU 901 of the image forming apparatus 10.

Figure 4:
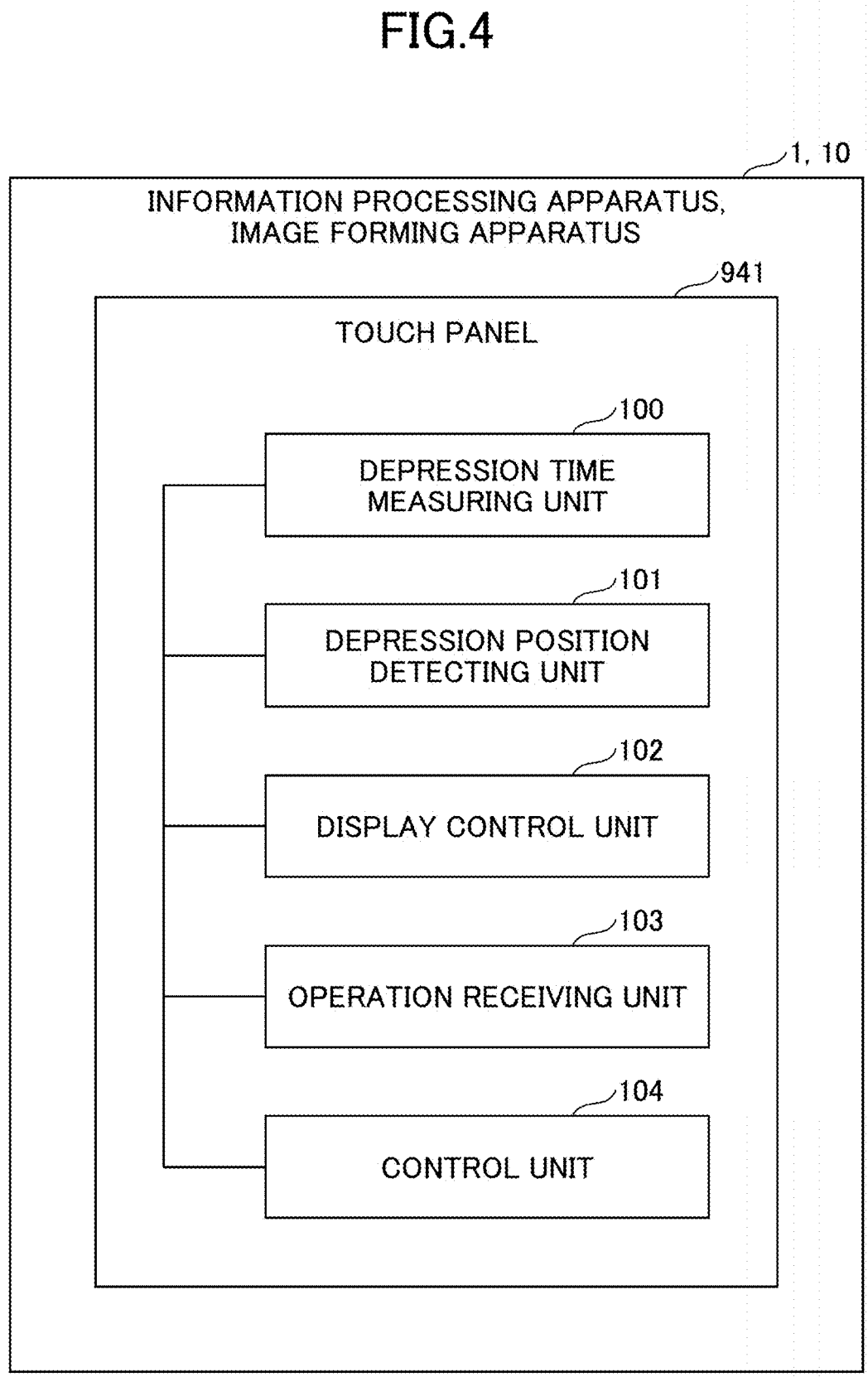
FIG. 4 is a diagram illustrating an example of a functional configuration of an information processing apparatus according to an embodiment of the present invention.

Next, a configuration of the function of the information processing apparatus 1 such as the image forming apparatus 10 of performing the processing of canceling the disablement of the input reception of the touch panel 941 will be described. FIG. 4 is a diagram illustrating an example of a functional configuration of an information processing apparatus according to an embodiment. The touch panel 941 of the information processing apparatus 1 includes a depression time measuring unit 100, a depression position detecting unit 101, a display control unit 102, an operation receiving unit 103, and a control unit 104 for executing the process of canceling the disablement of input reception.

The depression time measuring unit 100 measures the time during which the user continuously presses the same position of the cancellation button after the user presses the cancel button to cancel the disablement on the touch panel 941.

When the user presses the cancel button, the depression position detecting unit 101 detects a position on the touch panel 941 that is pressed and detects whether the same depression position is continuously pressed. If the depression position moves, the depression position after movement is detected.

The display control unit 102 controls a display, such as a menu screen for starting the disablement of input reception displayed on the touch panel 941, a cancel button for canceling the disablement of input reception, and a setting screen relating to the canceling of the disablement of input reception. Further, the display control unit 102 displays the cancel button in a transparent manner or moves the position where the cancel button is displayed in response to the pressing of the cancel button.

The operation receiving unit 103 receives input such as an operation to start disabling the input reception, the depression of the cancel button, and a setting input relating to the cancellation of the disablement of the input reception via the touch panel 941.

The control unit 104 cancels the disablement of the input reception based on the time during which the cancel button is pressed measured by the depression time measuring unit 100 and the depression position of the cancel button detected by the depression position detecting unit 101.

<Process of Starting Disablement of Input Reception>

Figure 5:
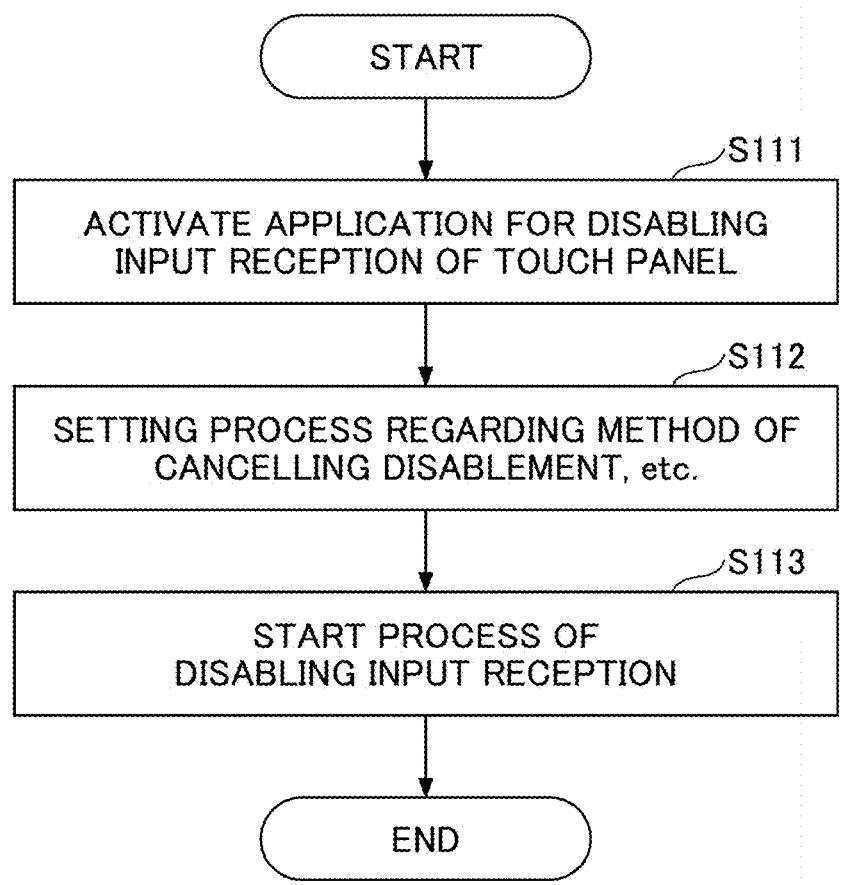
FIG. 5 is a diagram illustrating an example of a flowchart illustrating a process of starting to disable input reception on a touch panel according to an embodiment of the present invention.

FIG. 5 is a diagram illustrating an example of a flowchart illustrating a process of starting to disable input reception of a touch panel. Hereinafter, each step of the processing until the disablement of the input reception is started in the touch panel 941 of the image forming apparatus 10 will be described.

Step S111: The image forming apparatus 10 transmits a menu screen to the touch panel 941. The display control unit 102 displays a menu screen on the touch panel 941. The operation receiving unit 103 receives an operation input, such as pressing a button by a user via the touch panel 941.

Figure 6:
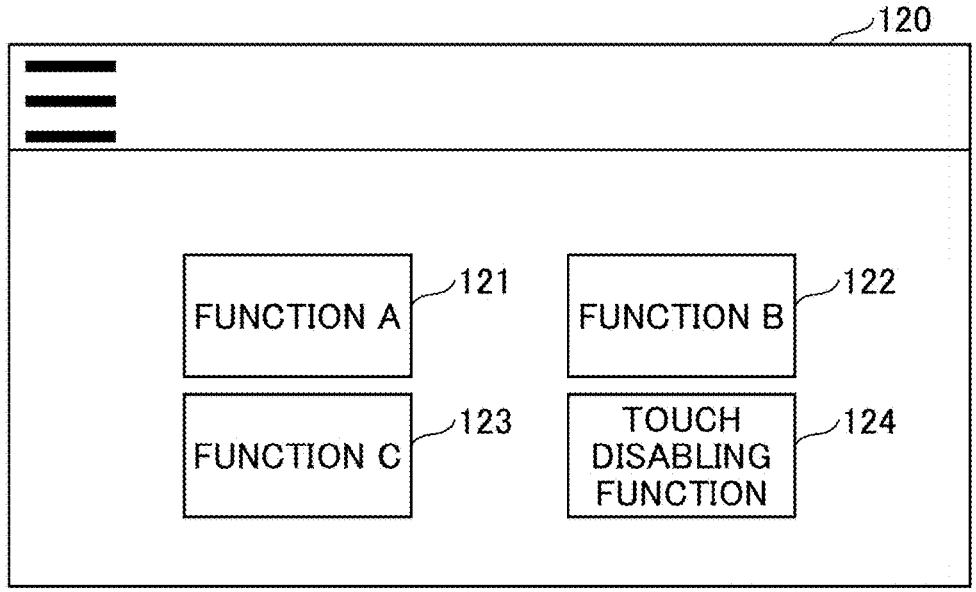
FIG. 6 is a diagram illustrating an example of a menu screen displayed on a touch panel of an image forming apparatus according to an embodiment of the present invention.

FIG. 6 is a diagram illustrating an example of a menu screen displayed on the touch panel 941 of the image forming apparatus 10. The menu screen 120 displays a function A 121, a function B 122, and a function C 123, which are buttons for activating applications of various functions executed by the image forming apparatus, and a touch disabling function 124 that activates an application that disables input reception of the touch panel 941.

Figure 7:
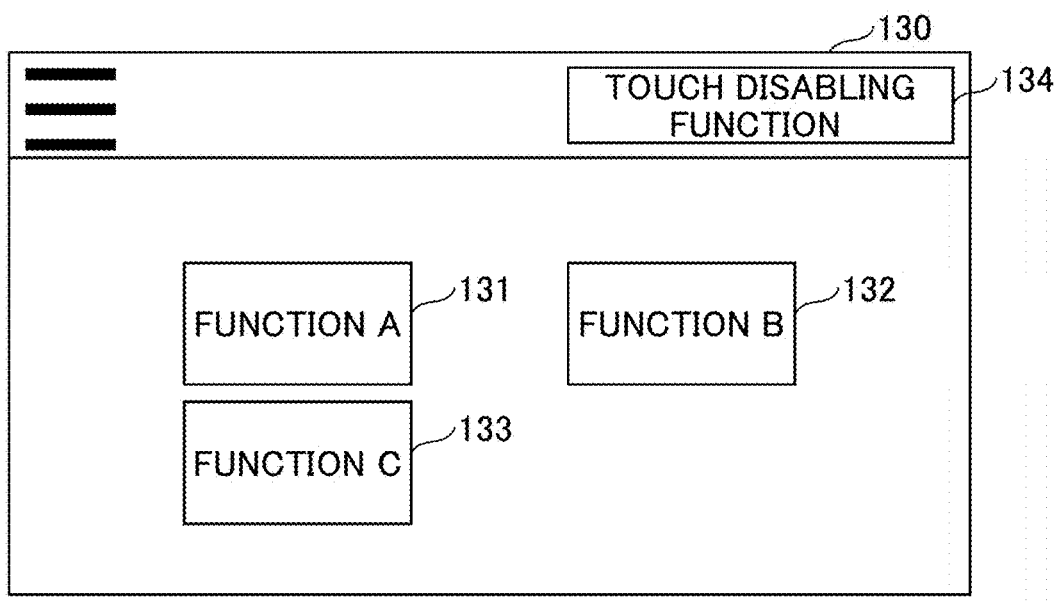
FIG. 7 is a diagram illustrating an example of a menu screen displaying a touch disabling function button indicated in the banner according to an embodiment of the present invention.

As another example of a menu screen, FIG. 7 illustrates an example of a menu screen in which a touch disabling function button is displayed in a banner portion. Similar to FIG. 6, a menu screen 130 displays a function A 131, a function B 132, and a function C 133, which are buttons for activating applications of various functions executed by the image forming apparatus, and a touch disabling function 134 that activates an application that disables input reception of the touch panel 941.

When the user activates an application by pressing a button of at least one of the various functions (functions A, B, and C), the screen of the application of at least one of the various functions is displayed below the banner portion of the touch panel 941. When the user wishes to temporarily disable the input reception of the touch panel 941 for cleaning or the like, the touch disabling function 124 or 134 is pressed. Here, in the menu screen 120 of FIG. 6, in order to press the touch disabling function 124 after activating the application of at least one of the various functions, it is necessary to end the application and display the menu screen 120. On the other hand, in the menu screen 130 of FIG. 7, after the application of at least one of the various functions is activated, the application that disables input reception can be activated by pressing the touch disabling function 134 without ending the application of at least one of the various functions.

Returning to FIG. 5, the processing of the next step will be described.

In step S112: The image forming apparatus 10 activates an application which disables input reception and transmits a setting screen for setting the application to the touch panel 941. The display control unit 102 displays the setting screen on the touch panel 941. The operation receiving unit 103 receives an operation input relating to the setting by a user via the touch panel 941.

Figure 8:
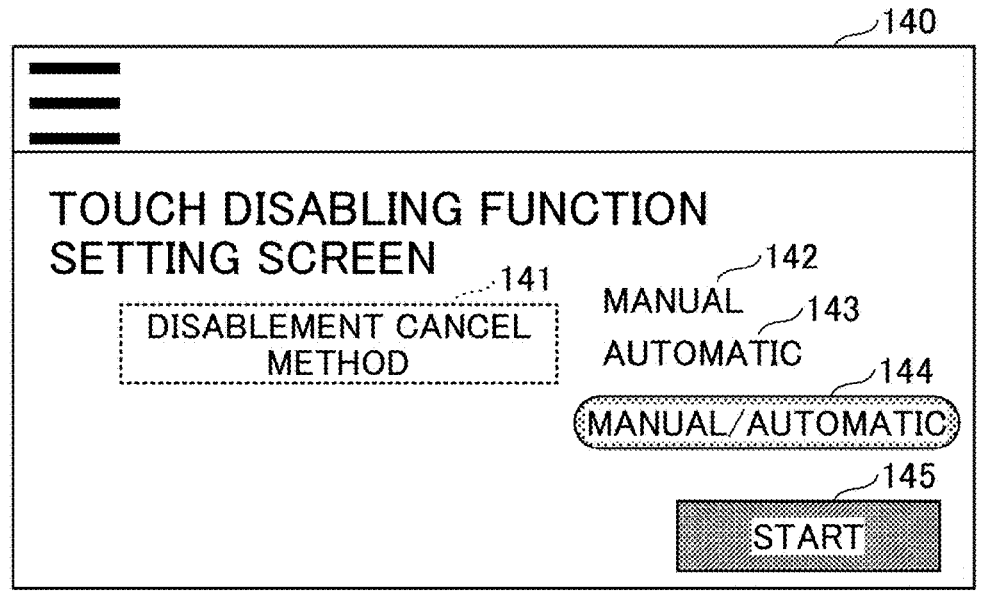
FIG. 8 is a diagram illustrating an example of an application setting screen to disable input reception according to an embodiment of the present invention.

FIG. 8 is a diagram illustrating an example of a setting screen of the application for disabling the input reception.

The setting screen 140 displays a disablement cancel method 141 as one of the settings of the application for disabling input reception, and displays manual 142, automatic 143, and manual/automatic 144 as options of the setting content. When the user selects manual 142, after the disablement of the input reception is started, a cancel button to cancel the disablement of input reception is displayed on the screen of the touch panel 941 so that the user can cancel the disablement at any timing. When the user selects automatic 143, after the disablement of the input reception is started, when a predetermined period of time elapses, the disablement is automatically canceled. When the user selects manual/automatic 144, after the disablement of the input reception is started, when a predetermined period of time elapses, the disablement is automatically canceled, but even before the predetermined period of time elapses, the user can cancel the disablement at any timing.

Returning to FIG. 5, the processing of the next step will be described.

Figure 9:
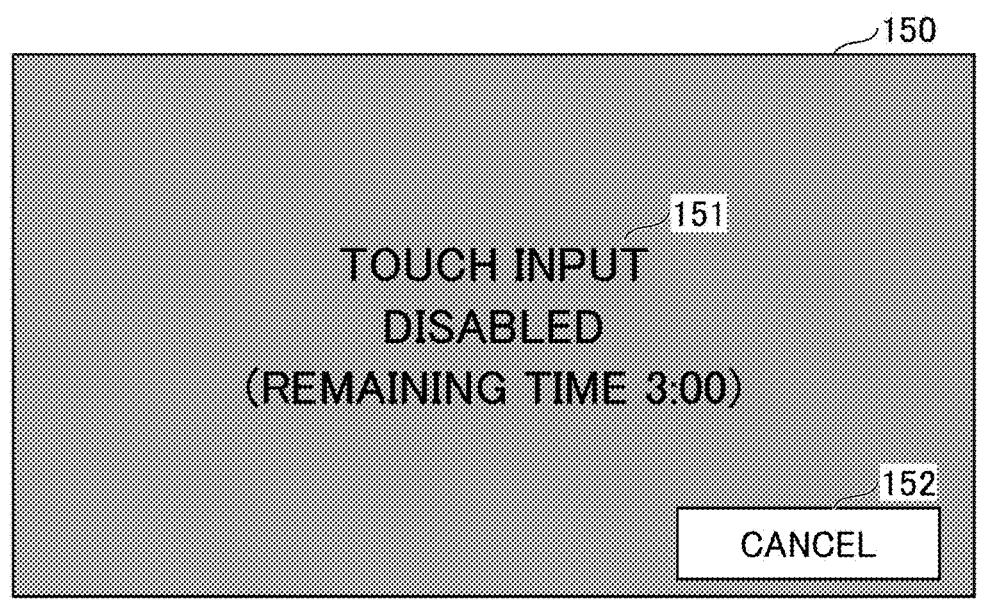
FIG. 9 is a diagram illustrating an example of a screen in which input reception on the touch panel is disabled according to an embodiment of the present invention.

Step S113: After completing the setting in the setting screen 140 illustrated in FIG. 8, the user presses a start button 145 to start disabling the input reception. In step S112, when no setting is made, the initial setting or the setting at the time of the last execution may be used. The image forming apparatus 10 transmits a disablement screen in which the input reception is disabled to the touch panel 941. The display control unit 102 displays a disablement screen on the touch panel 941. When manual 142 or manual/automatic 144 is selected in step S112, the operation receiving unit 103 receives only the operation input of cancelling the disablement of the input reception. FIG. 9 is a diagram illustrating an example of a screen in which input reception on the touch panel is disabled (a disablement screen). A disablement screen 150 displays a message 151 that touch input is disabled (remaining time: 3:00) and a cancel button 152 for canceling the disablement.

As a result of the above-described processing, it is possible to start disabling the input reception in the touch panel 941 of the image forming apparatus 10.

<Disabling Input Reception>

Figure 10:
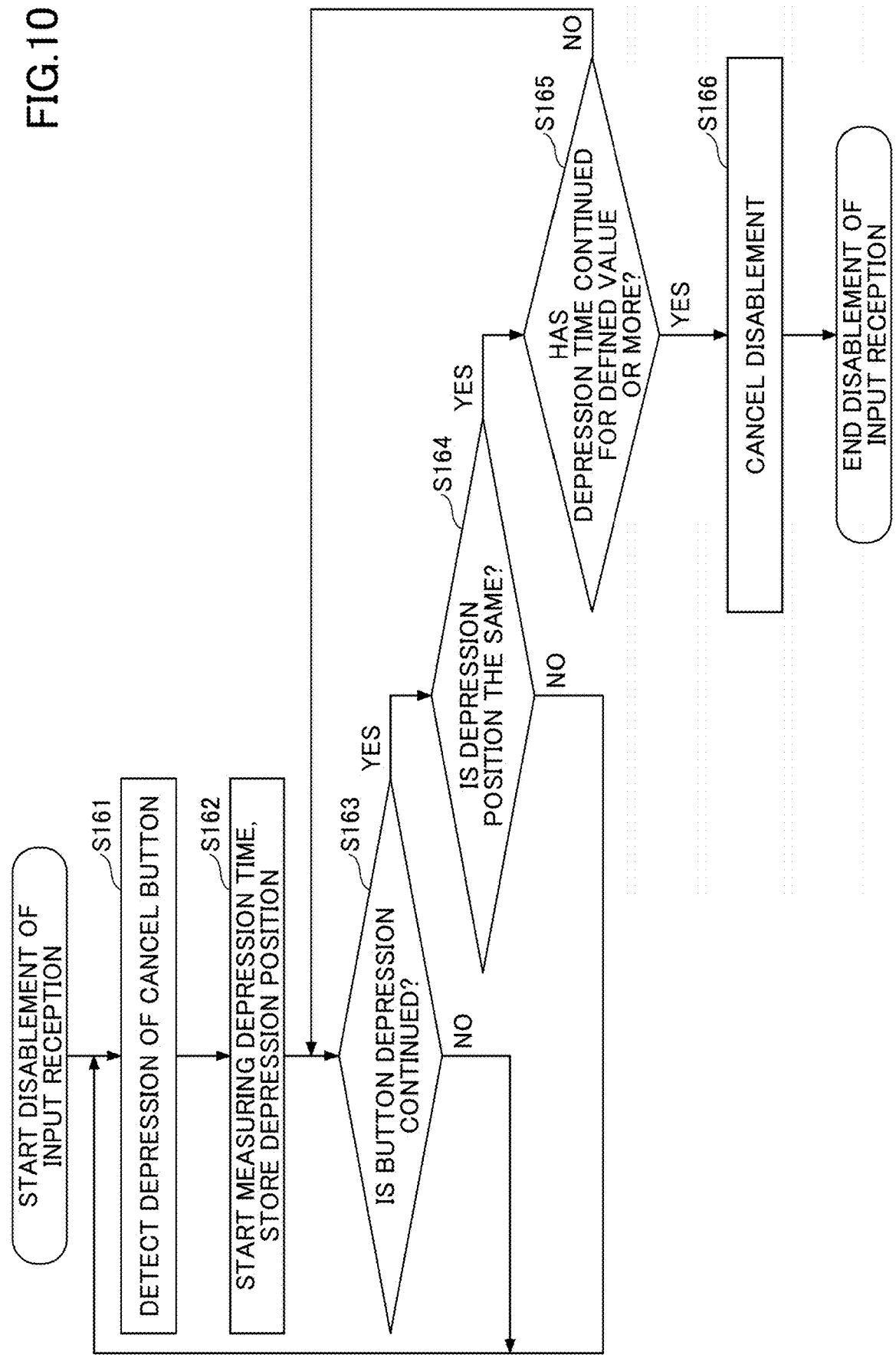
FIG. 10 is a diagram illustrating an example of flowchart of a process of cancelling the disablement of input reception on a touch panel according to an embodiment of the present invention.

FIG. 10 is a diagram illustrating an example of a process of disabling input reception of 2C a touch panel. In the flowchart process, a cancel button is displayed on the touch panel for cancelling the disablement of the input reception so that the user can cancel the disablement of the input reception at any timing after temporarily disabling the input reception. Further, considering the convenience when cleaning the touch panel, by cancelling the disablement only under limited conditions with respect to the depression position and the depression time of the cancel button, it is possible to prevent the user from accidentally cancelling the disablement. Specifically, the disablement of the input reception is cancelled if the user continues to press the cancel button for a period longer than a defined value defined in advance (referred to as a cancel depression time) without moving the depression position. Each step for implementing the present process will be described below.

Step S161: The operation receiving unit 103 reports, to the depression time measuring unit 100 and the depression position detecting unit 101, the depression of the cancel button when the operation receiving unit 103 detects the depression of the cancel button after the disablement of the input reception on the touch panel is started. Alternatively, the depression time measuring unit 100 may detect the depression of the cancel button.

Step S162: The depression time measuring unit 100 starts to measure the depression time from the time point when the cancel button is pressed. The depression position detecting unit 101 stores the coordinates (depression position) at which the cancel button is pressed.

Step S163: The depression time measuring unit 100 detects whether the depression of the cancel button continues. If the detection result is continuing (YES), the process proceeds to step S164. If the detection result is not continuing (NO), the process proceeds to step S161.

Step S164: The depression position detecting unit 101 detects whether the depression position stored in step S162 and the current depression position are the same. When the depression positions are the same (YES), the process proceeds to step S165, and when the depression positions are different (NO), the process proceeds to step S161.

Step S165: The depression time measuring unit 100 detects whether the depression time of the cancel button has continued for a defined value defined in advance (cancel depression time) or more. If the detection result is continued (YES), the process proceeds to step S166. If the detection result is not continued (NO), the process proceeds to step S163.

In step S166, the control unit 104 cancels the disablement of the input reception based on the detection result in steps S163 to S165. The display control unit 102 displays a menu screen on the touch panel 941.

As a result of the above-described processing, by detecting that the same position of the same cancel button is pressed for a defined value (cancel depression time) or more, the image forming apparatus 10 can cancel the disablement of the input reception at any timing intended by the user. The disablement of the input reception is not cancelled if it is detected that depression of the button is ended (the finger moves away from the touch panel) or the depression position is moved (the finger moves on the touch panel) before the cancel depression time has elapsed.

<Process of Making the Cancel Button Transparent for a Certain Time Period>

When the cancel button to cancel the disablement of the input reception on the touch panel is displayed on the screen, there may be cases where it is difficult to confirm a smear at the position of the cancel button. Therefore, by temporarily making the cancel button transparent when the cancel button is pressed for a shorter time than the cancel depression time, a smear at the position of the cancel button can be easily confirmed. Here, making the cancel button transparent means that the cancel button appears to be the same as the background of the screen. Alternatively, rather than making the cancel button completely transparent, the cancel button may be transparent to a predetermined degree. For example, with respect to the pixel value (X) of the background screen and the pixel value (Y) of the original cancel button, the pixel value (Y') of the cancel button having a transparency degree of A % is expressed as follows.

$$Y'=\{A \times X+(100-A) \times Y\}/100$$

Further, the degree of transparency or the time of making the cancel button transparent (the transparency time) may also be set in the setting screen 140 illustrated in FIG. 8.

Figure 11:
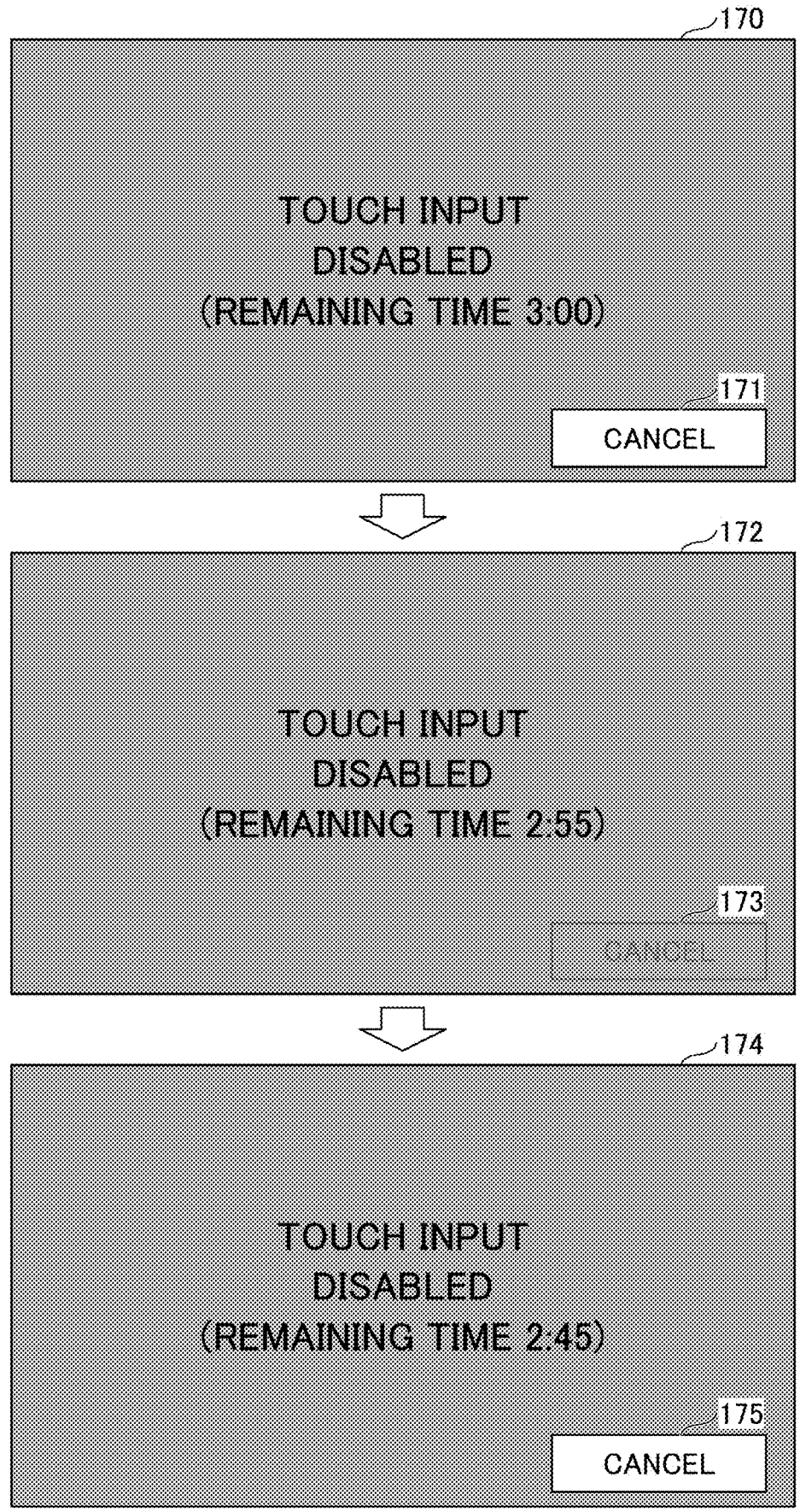
FIG. 11 is a diagram illustrating an example of screen transition when the cancel button is made transparent for a certain time period after being pressed according to an embodiment of the present invention.

FIG. 11 is a diagram illustrating an example of a screen transition when the cancel button is made transparent for a certain time after being pressed. A screen 170 illustrates the time point when the disablement of the input reception starts, and the cancel button 171 is not transparent. A screen 172 illustrates a state where the cancel button has become transparent by pressing the cancel button for a time shorter than the cancel depression time, at 5 seconds after the start of the disablement (remaining time: 2:55). A screen 174 illustrates that the cancel button has returned to the original state after a certain period of time (transparency time=10 seconds) has elapsed after the cancel button has become transparent.

<Process of Making the Cancel Button Transparent Immediately After Disabling the Input Reception>

As the timing of making the cancel button transparent, the cancel button may be made transparent for a certain period of time immediately after starting to disable the input reception on the touch panel. Alternatively, the cancel button may be made transparent by the transparency degree described above, and the transparency degree and the transparency time may also be set in the setting screen illustrated in FIG. 8.

Figure 12:
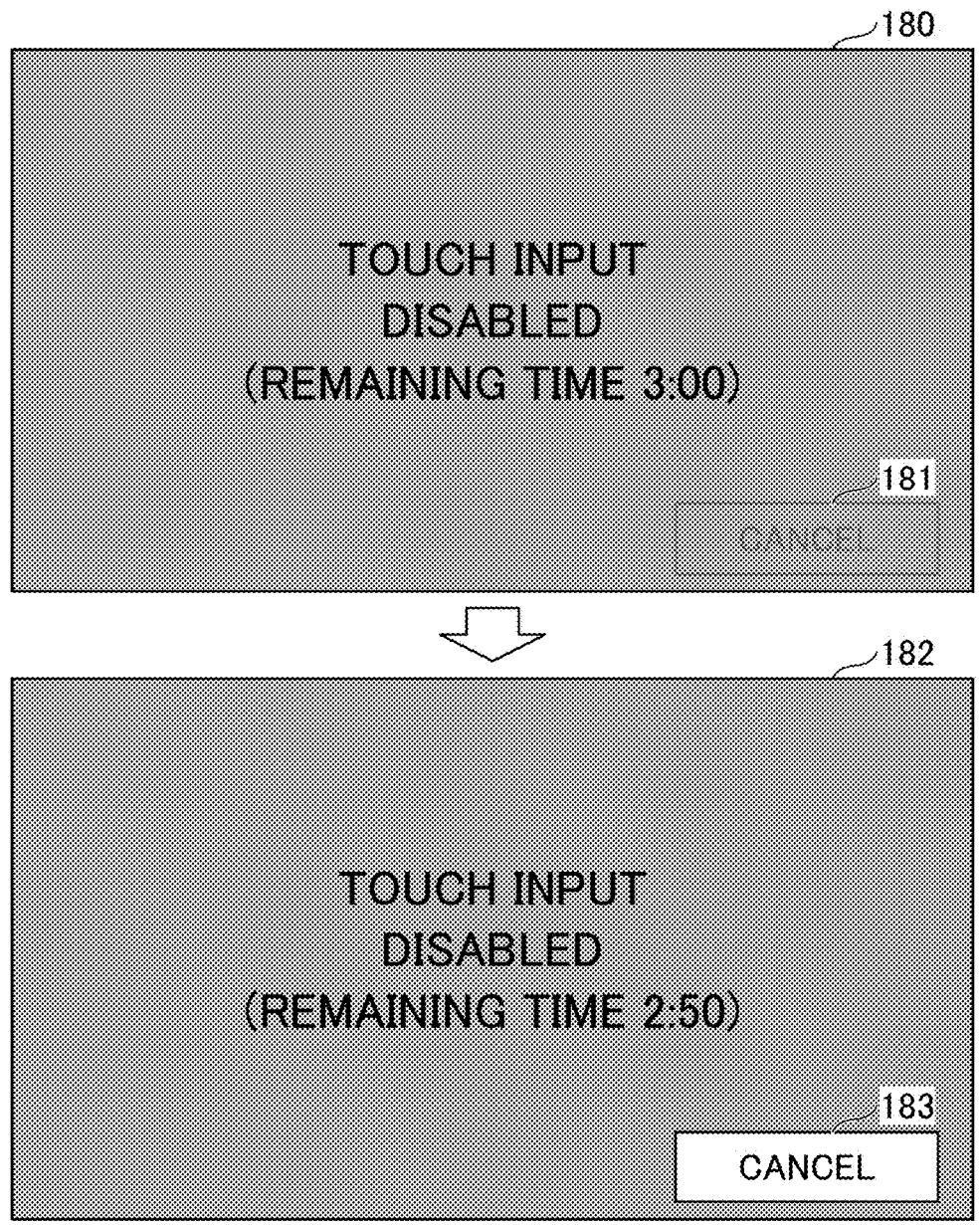
FIG. 12 is a diagram illustrating an example of screen transition when the cancel button is made transparent immediately after the disablement of input reception according to an embodiment of the present invention.

FIG. 12 is a diagram illustrating an example of the screen transition when the cancel button is made transparent immediately after disabling the input reception. A screen 180 illustrates the time point when the disablement of the input reception starts, and a cancel button 181 is transparent. A screen 182 illustrates that a cancel button that is not transparent is displayed after a certain period of time (transparency time=10 seconds).

<Process of Moving the Position of the Cancel Button>

In order to avoid a situation where it is difficult to confirm the smear at the position of the cancel button, the position of the cancel button can be moved when the cancel button is pressed for a shorter time than the cancel depression time, as an alternative to making the cancel button transparent.

The position to which the cancel button is to be moved, for example, may be at a point symmetric position relative to the original position with respect to the center point of the screen, or at a line symmetric position relative to the original position with respect to a line dividing the screen in half vertically or horizontally. When the cancel button is pressed again for a shorter time than the cancel depression time after moving, the cancel button may be further moved to a different position or moved to the original position.

Figure 13:
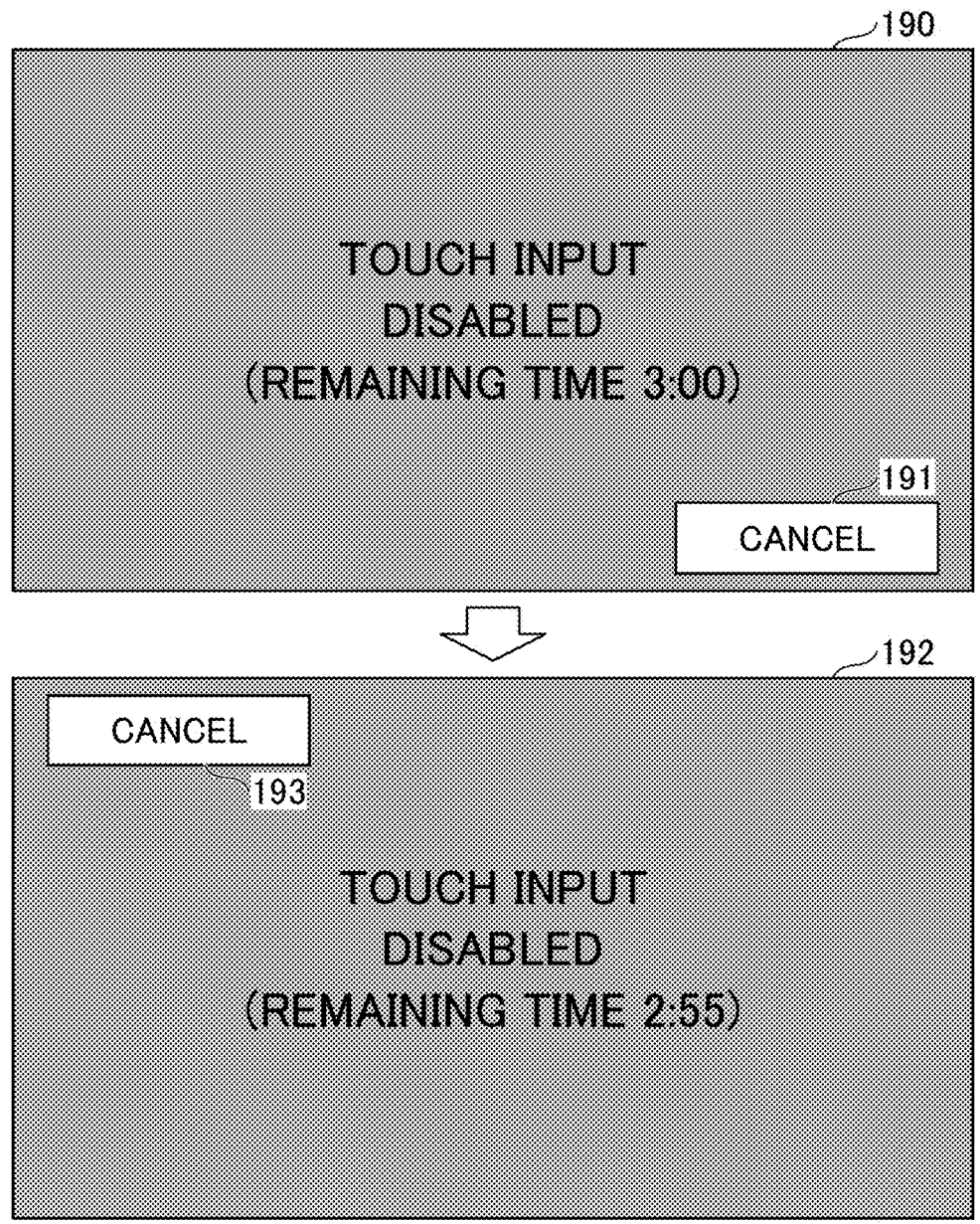
FIG. 13 is a diagram illustrating an example of screen transition when moving the position of the cancel button according to an embodiment of the present invention.

FIG. 13 is a diagram illustrating an example of the screen transition when the position of the cancel button is moved. A screen 190 illustrates the time point when disablement of the input reception is started, and the cancel button 191 is displayed in the lower right of the screen. A screen 192 illustrates a state where the display position of the cancel button is moved to the upper left of the screen by pressing the cancel button for a time shorter than the cancel depression time, at 5 seconds after the start of the disablement (remaining time: 2:55).

A setting of whether to enable a function of making the cancel button transparent or moving the cancel button as illustrated in FIG. 11, FIG. 12, and FIG. 13, can also be set in the setting screen 140 illustrated in FIG. 8.

As a result of the above-described processing, the information processing apparatus 1 according to the present embodiment can cancel (or may be referred to as terminate) the disablement of the input reception at any timing after temporarily disabling the input reception, by displaying a button 2C for cancelling (terminating) the disablement on the touch panel. In order to prevent the user from accidentally cancelling the disablement, the disablement is cancelled when the cancel button is detected to have been pressed at the same depression position for a certain time period or longer. In consideration of the convenience of cleaning the touch panel, it is also possible to make the cancel button transparent for a certain period of time when the cancel button is pressed for a short time or immediately after the input reception is disabled, or to move the position of the cancel button when the cancel button is pressed for a short time.

According to one embodiment of the present invention, the user can cancel the disablement of input reception on the touch panel at any timing.

The information processing apparatus, the information processing method, and the recording medium are not limited to the specific embodiments described in the detailed description, and variations and modifications may be made without departing from the spirit and scope of the present invention.

For example, the configuration example of the functional block diagram of FIG. 4 indicated in the above embodiment is divided according to the main functions to facilitate the understanding of processes by the information processing apparatus 1. The present invention is not limited by how the process units are divided or the names of the process units. The processes of the information processing apparatus 1 may be further divided into many process units according to the process contents. Furthermore, the process units may be divided such that a single process unit further includes many processes.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

Also, the apparatus group described in the examples are merely indicative of one of a plurality of computing environments for carrying out the embodiments disclosed herein. In some embodiments, the information processing apparatus 1 includes a plurality of computing devices, such as server clusters. The plurality of computing devices are configured to communicate with each other via any type of communication link, including networks, a shared memory, and the like, and perform the processes disclosed herein.

What is claimed is:

1. An information processing apparatus comprising: circuitry; and a memory storing computer-executable instructions that cause the circuitry to execute:
   displaying, on a touch panel, a first screen including at least a first button to start a disablement of input reception of the touch panel;
   starting the disablement in response to detecting the first button being operated;
   during the disablement, displaying a second screen including at least a second button as a cancel button to cancel the disablement and indicating that the disablement is being performed, measuring a depression time during which the cancel button is pressed by a user, and detecting a depression position at which the cancel button is pressed by the user;
   cancelling the disablement in response to detecting that a predetermined period of time since the disablement was initiated has elapsed;
   cancelling the disablement in response to detecting that the depression time is longer than a cancel depression time defined in advance and that the depression position is continuously located at the same position, even if the predetermined period of time since the disablement was initiated has not yet elapsed; and wherein the displaying includes moving a position at which the second button is to be displayed to a different position, in response to detecting that the second button is operated for a shorter time than the cancel depression time.

2. The information processing apparatus according to claim 1, wherein the displaying includes displaying the second button in a transparent manner for a predetermined time period from a time point when the disablement is started, by making a pixel value for displaying the second button to be the same as a pixel value of a background screen of the touch panel or by making the pixel value of the second button to be close to the pixel value of the background screen.

3. The information processing apparatus according to claim 2, wherein the second screen further displays a remaining time to the predetermined period of time.

4. The information processing apparatus according to claim 1, wherein the displaying includes displaying the second button in a transparent manner for a predetermined time period in response to detecting that the cancel button is operated for a shorter time than the cancel depression time, by making a pixel value for displaying the second button to be the same as a pixel value of a background screen of the touch panel or by making the pixel value of the second button to be close to the pixel value of the background screen.

5. The information processing apparatus according to claim 1, wherein the different position is at a point symmetric position-relative to an original position-of the cancel button with respect to a center point of a screen of the touch panel, or at a line symmetric position relative to the original position of the cancel button with respect to a line dividing the screen in half vertically or horizontally.

6. The information processing apparatus according to claim 1, wherein
   the displaying includes displaying a setting screen for setting the cancel depression time before the disablement is started; and
   the circuitry is further caused to execute receiving input of the cancel depression time at the setting screen.

7. The information processing apparatus according to claim 1, wherein the second screen further displays a remaining time to the predetermined period of time.

8. The information processing apparatus according to claim 1, wherein the computer-executable instructions further cause the circuitry to execute:
   displaying a function selection screen on the touch panel to receive a selection of one function among a plurality of functions including at least a function of the disablement of input reception of the touch panel; and
   displaying the first screen, in response to receiving the selection of the function of the disablement of input reception of the touch panel via the function selection screen.

9. The information processing apparatus according to claim 8, wherein the function of the disablement of input reception of the touch panel is displayed in a banner portion.

10. The information processing apparatus according to claim 1, wherein the first screen includes a plurality of disablement cancel methods including a manual method, an automatic method and a manual/automatic method to be selected by a user, and
   wherein, in a state of the manual/automatic method being selected, the disablement is canceled in response to detecting that a predetermined period of time since the disablement was initiated has elapsed; and the disablement is canceled in response to detecting that the second button is operated, even if the predetermined period of time since the disablement was initiated has not yet elapsed.

11. An information processing method performed by an information processing apparatus;

the information-processing method comprising:

displaying, on a touch panel, a first screen including at least a first button to start a disablement of input reception of the touch panel;

starting the disablement in response to detecting the first button being operated;

during the disablement, displaying a second screen including at least a second button as a cancel button to cancel the disablement and indicating that the disablement is being performed, measuring a depression time during which the cancel button is pressed by a user, and detecting a depression position at which the cancel button is pressed by the user;

cancelling the disablement in response to detecting that a predetermined period of time since the disablement was initiated has elapsed;

cancelling the disablement in response to detecting that the depression time is longer than a cancel depression time defined in advance and that the depression position is continuously located at the same position, even if the predetermined period of time since the disablement was initiated has not yet elapsed; and wherein the displaying includes moving a position at which the second button is to be displayed to a different position, in response to detecting that the second button is operated for a shorter time than the cancel depression time.

12. A non-transitory computer-readable recording medium storing a program that causes a computer to execute a process performed in an information processing apparatus, the process comprising:

displaying, on a touch panel, a first screen including at least a first button to start a disablement of input reception of the touch panel;

starting the disablement in response to detecting the first button being operated;

during the disablement, displaying a second screen including at least a second button as a cancel button to cancel the disablement and indicating that the disablement is being performed, measuring a depression time during which the cancel button is pressed by a user, and detecting a depression position at which the cancel button is pressed by the user;

cancelling the disablement in response to detecting that a predetermined period of time since the disablement was initiated has elapsed; and cancelling the disablement in response to detecting that the depression time is longer than a cancel depression time defined in advance and that the depression position is continuously located at the same position, even if the predetermined period of time since the disablement was initiated has not yet elapsed; and wherein the displaying includes moving a position at which the second button is to be displayed to a different position, in response to detecting that the second button is operated for a shorter time than the cancel depression time.

* * * * *